United States Patent Office 3,535,638
Patented Oct. 20, 1970

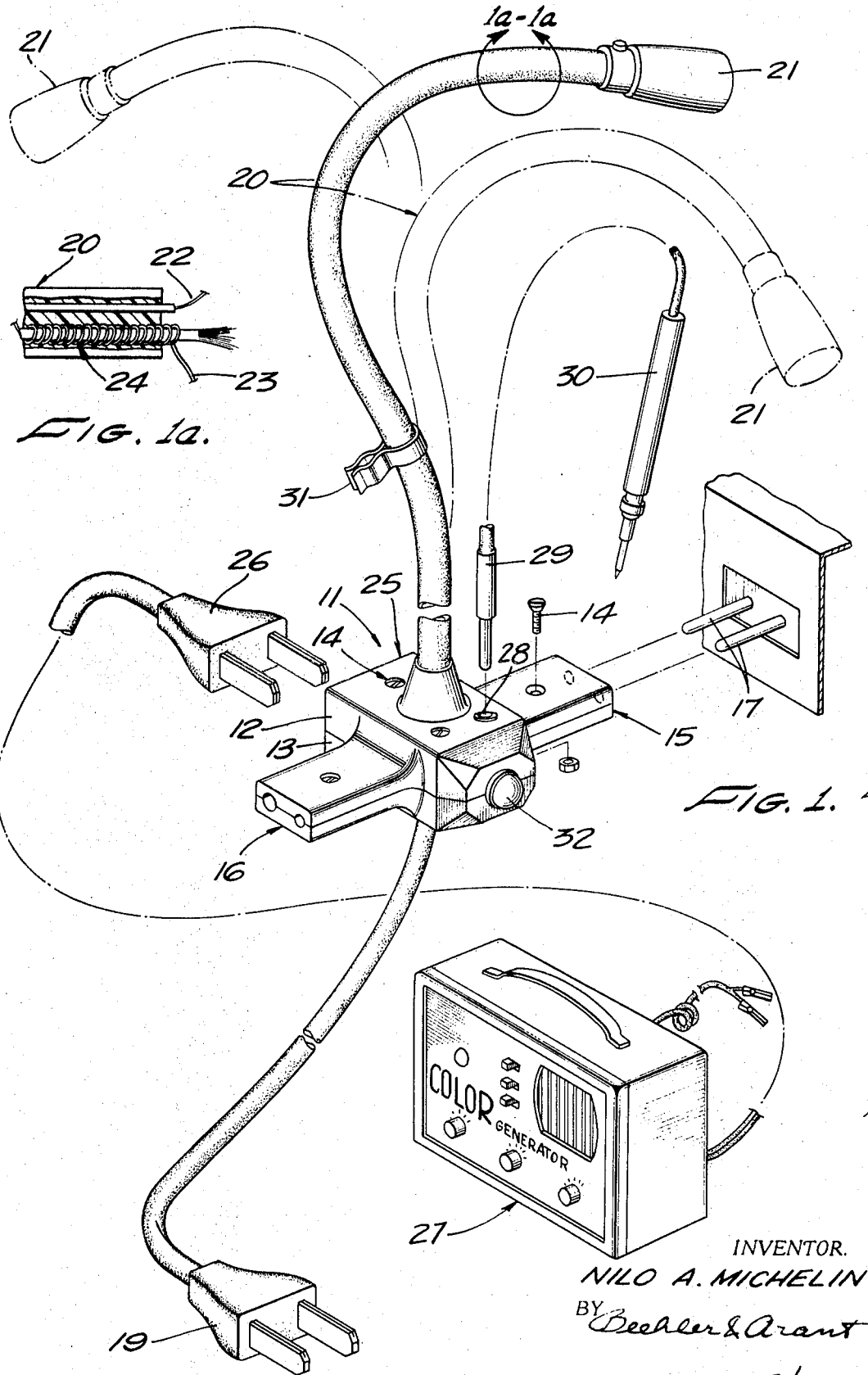

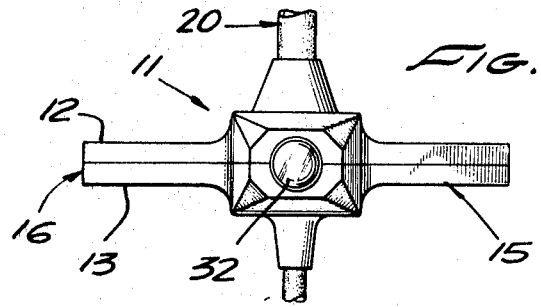
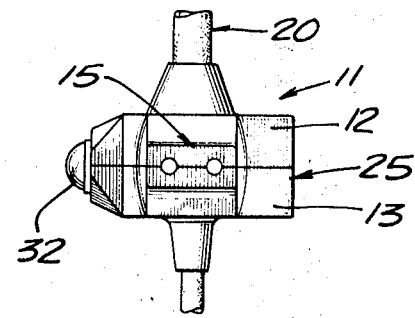
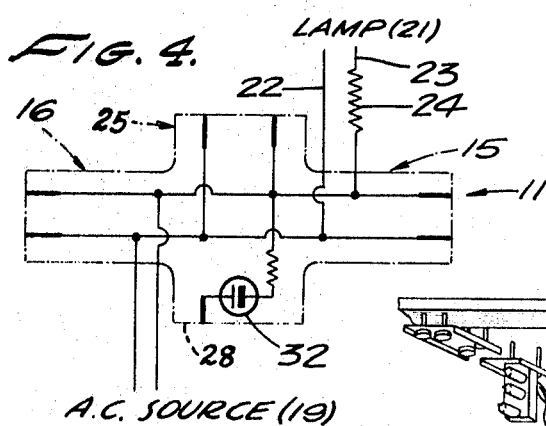
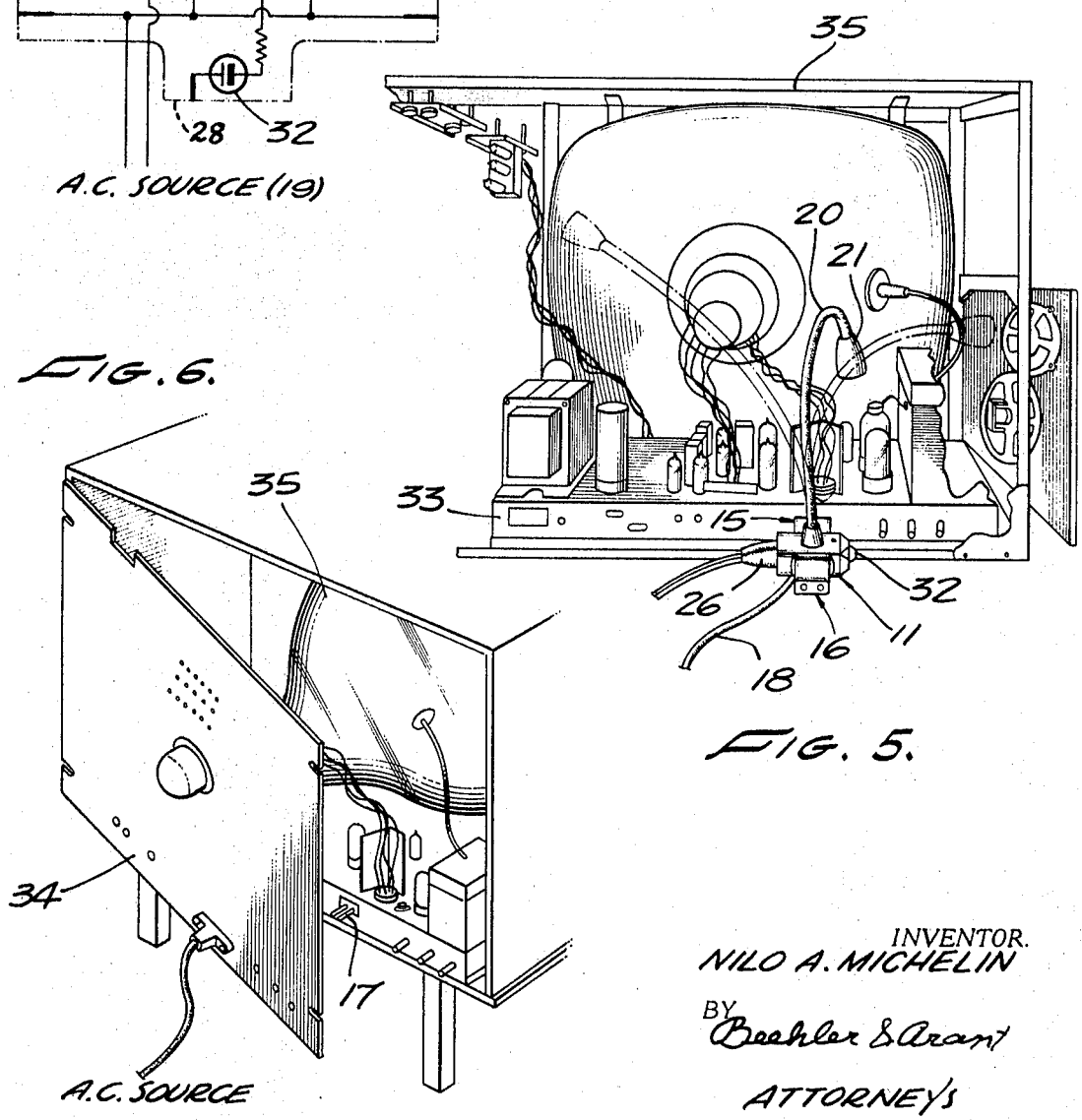

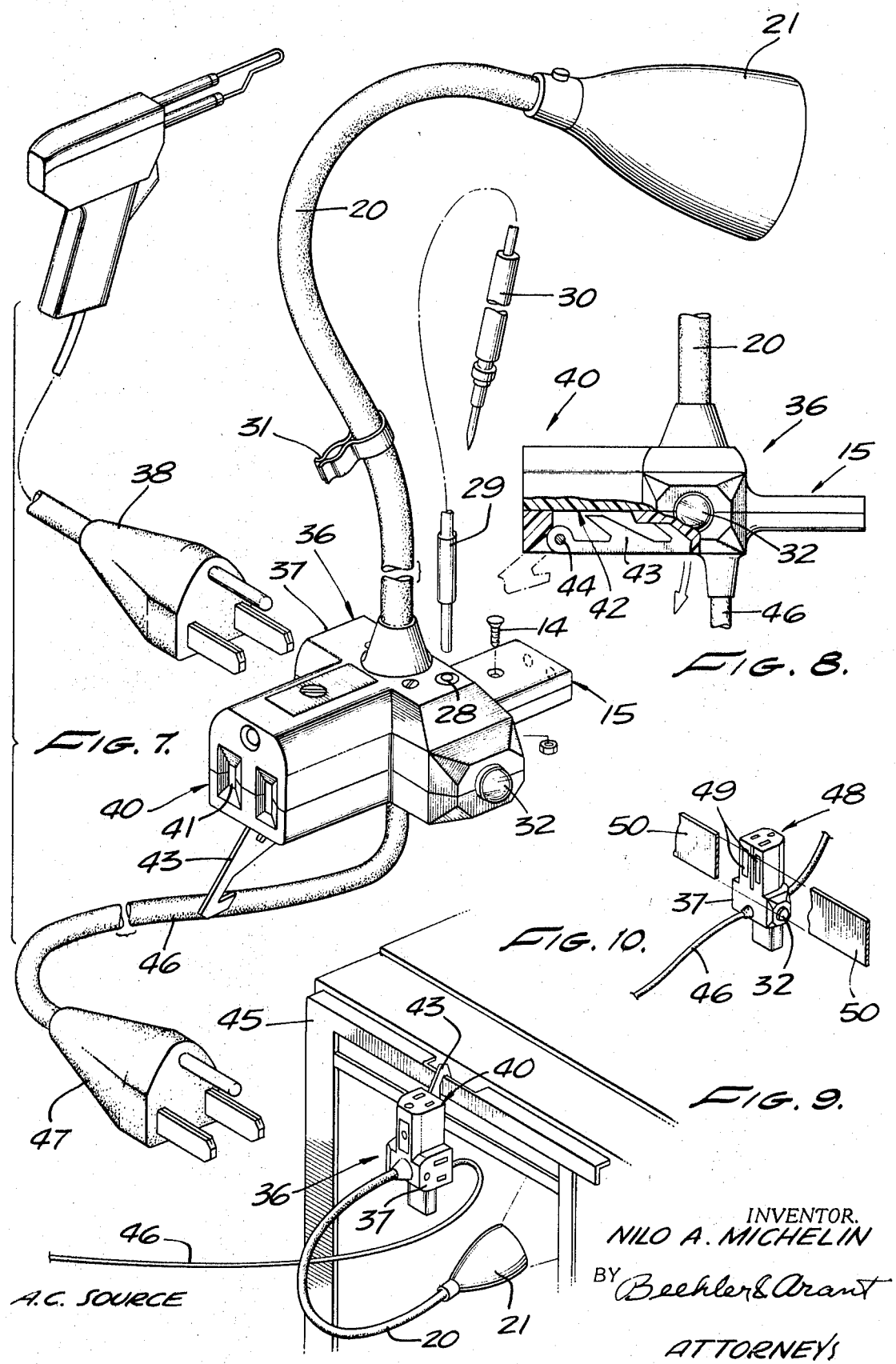

3,535,638
ELECTRICAL UNIT FOR USE IN TESTING OR RE-
PAIRING TELEVISION RECEIVER SETS INCLUD-
ING MEANS FOR DETACHABLE FASTENING TO
THE SET
Nilo A. Michelin, 3905 W. Slauson Ave.,
Los Angeles, Calif. 90043
Filed Dec. 20, 1967, Ser. No. 692,064
Int. Cl. G01r 1/06; H01r 13/60
U.S. Cl. 324—149
3 Claims

ABSTRACT OF THE DISCLOSURE

An electrical unit for facilitating repairs to an appliance, including a central adapter body, means for detachably fastening the body to an appliance to be repaired, a lamp having a flexible neck which is permanently secured to the body, a power cord connected to the body and wired internally for energizing the lamp, and at least one outlet provided on the body for other purposes related to the appliance repair work.

BACKGROUND OF THE INVENTION

Appliance repair work generally requires good illumination in small, enclosed spaces in the interior of the appliance, which is not readily available. It is also often necessary to utilize a separate electrical power circuit for some auxiliary purpose, related to the appliance repair.

Particularly in the field of electrical repairs to television sets, there are other special problems. One is that the removal of the rear panel of the television set disconnects the safety interlock, thus causing the circuitry inside the set to become de-energized. Another special requirement of television repair is that it is desirable to test various separate points of the internal circuitry to determine whether or not they are in an electrically energized condition.

Thus the primary purpose of the invention is to provide a convenient illumination means which is readily attached to an appliance to be repaired, and which includes auxiliary power circuit means as part of the same device.

A related and more specific object of the invention is to provide an electrical unit having special utility in the repair of television sets, by furnishing a replacement for the safety interlock as well as a means for testing the electrical condition of the circuitry.

DRAWING SUMMARY

FIG. 1 is a perspective view of one form of the invention;

FIG. 1a is a partial sectional view of the lamp bracket, the section being taken at 1a—1a in FIG. 1;

FIG. 2 is a side view of the plug-adapter shown in FIG. 1;

FIG. 3 is an end view of the same;

FIG. 4 is a schematic view of the electrical circuit of the plug-adapter;

FIG. 5 is an elevation view of a typical TV chassis, showing the plug-adapter of FIG. 1 in operative connection thereto;

FIG. 6 is a partial perspective view of the TV chassis of FIG. 5 showing the power interlock;

FIG. 7 is a view similar to FIG. 1 showing a modified form of the invention;

FIG. 8 is a side view, partly in section, of the plug-adapter shown in FIG. 7;

FIG. 9 is a perspective view showing the plug-adapter of FIG. 8 supported on a TV chassis; and FIG. 10 is a perspective view of another modified form of the invention.

PREFERRED EMBODIMENT

Referring more particularly to the drawings, and especially to FIGS. 1 to 6 which show one form of the invention, there is there shown a plug-adapter 11 in the general form of a hollow block of insulating material having mating parts 12 and 13 secured together as by bolts 14 or the equivalent. The plug-adapter has a standard jack extension 15 on one side and, on the other side, a polarized jack extension 16 for connection with a TV chassis power plug 17. A power supply cable extends from the bottom of the adapter and has a conventional plug 19 at its end. A flexible goose-neck lamp bracket 20 rises from the top of the adapter and carries a lamp 21 for illuminating the work. Bracket 20 contains conductors 22 and 23, the latter having a voltage-reducing resistor portion 24.

One side of the adapter is formed as a standard receptacle 25 for a plug 26 for connection to an appliance such as a color generator 27. Part 12 is formed with a jack 28 for receiving a plug 29 connected to a test probe 30. Lamp bracket 20 is shown as mounting a clip 31 for holding probe 30 when not in use. The remaining side of the adapter provides mounting for a neon indicator lamp 32. The internal electrical circuit and connections of the adapter are shown diagrammatically in FIG. 4. FIGS. 5 and 6 illustrate the manner of supporting the adapter 11 by a TV chassis 33. Jack extension 15 is engaged with chassis plug 17 when the rear panel 34 of the receiver 35 is opened, the adapter thus forming a "cheater" connection.

ALTERNATE FORMS

FIGS. 7 and 9 show a modified form of the invention which comprises a plug-adapter 36 similar in part to adapter 11. This adapter has a side extension 37 forming a receptacle for a three-prong plug 38 connected to an appliance 39, such as a soldering iron. This adapter has a side extension 40 providing a standard two-wire receptacle 41. Extension 40 is formed with a recess 42 in which is received a mounting hook 43 pivoted at 44 to an extended position whereby the adapter may be supported from a chassis or cabinet member 45, as seen in FIG. 9. Adapter 36 is powered from a cable 46 having a three-prong plug 47.

FIG. 10 shows another modified form of the invention comprising a plug-adapter 48 which is generally similar to adapters 11 and 36. This adapter however mounts a pair of magnets 49 by which the adapter may be held on a ferrous metal part 50 of a TV receiver chassis or the like.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

Having described the invention, what is claimed as new in support of Letters Patent is:

1. An electrical unit for use in testing or repairing television receiver sets, comprising:

a rigid central body having a power inlet circuit adapted for receiving power from a plug-in cord;

an extension jack extending from said central body and forming a female plug adapted to receive the male prongs on the power kit of the television receiver circuit to thereby rigidly mechanically support said central body, said female plug being electrically connected through the interior of said central body to said power inlet circuit whereby said plug-in cord serves as a cheater cord for bypassing the safety interlock of the television receiver;

at least one auxiliary repair or test device supported from said central body and electrically connected through the interior of said central body to said power inlet circuit;

said auxiliary device including a test probe for engaging selected contact points in the interior circuitry of the television set, a flexible cord coupling said test probe to a point on said central body, and an indicator bulb supported on said central body and electrically connected in series between said test probe cord and one side of said power inlet circuit to thereby provide a visual indication of energization of various test points to which said test probe is connected;

and an additional jack extension on said central body forming a polarized female socket which is interconnected through the interior of said central body to said power inlet circuit.

2. The electrical unit claimed in claim 1 which further includes a jack on said test probe cord and a plug carried by said rigid central body for receiving said jack, whereby said test probe and test probe cord may be completely detached from said central body.

3. The electrical unit claimed in claim 1 which additionally includes a flexible tubular conduit having one end attached to said central body and extending outwardly therefrom, and a lamp attached to the outer end of said conduit, the inner end of said conduit being electrically connected through the interior of said central body to said power inlet circuit.

References Cited

UNITED STATES PATENTS

| | | |
|---|---|---|
| 2,484,092 | 10/1949 | Hopgood. |
| 2,548,991 | 4/1951 | McNabb _____ 324—51 |
| 2,581,497 | 1/1952 | Podell. |
| 2,622,214 | 12/1952 | Bronson et al. ____ 324—51 XR |
| 2,696,607 | 12/1954 | Witkin _____ 340—253 XR |
| 2,705,773 | 4/1955 | Ward _____ 324—51 XR |
| 2,721,717 | 10/1955 | Wales _____ 339—12 XR |
| 2,752,563 | 6/1956 | Bowden _____ 324—51 XR |
| 2,794,167 | 5/1957 | Jones _____ 324—53 |
| 3,130,366 | 4/1964 | Draper _____ 324—149 |
| 2,167,209 | 7/1939 | Huskey _____ 324—51 |

GERARD R. STRECKER, Primary Examiner

U.S. Cl. X.R.

324—51; 339—12, 28, 113, 119, 157